(12) United States Patent
Gleason et al.

(10) Patent No.: US 7,968,169 B2
(45) Date of Patent: Jun. 28, 2011

(54) COMPOUND CONTOURED COMPOSITE BEAMS AND FABRICATION METHODS

(75) Inventors: Gregory R. Gleason, Seattle, WA (US); Grant C. Zenkner, Puyallup, WA (US); Troy A. Haworth, Redmond, WA (US); Nazir M. Kaabour, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 11/835,202

(22) Filed: Aug. 7, 2007

(65) Prior Publication Data

US 2009/0041974 A1 Feb. 12, 2009

(51) Int. Cl.
*B32B 7/00* (2006.01)
*B32B 27/00* (2006.01)
*B32B 27/02* (2006.01)

(52) U.S. Cl. ............ 428/119; 156/96; 428/98; 428/105; 428/113; 428/116; 428/297.7; 428/298.1; 428/299.7; 428/300.7; 428/301.4

(58) Field of Classification Search .................. 428/119, 428/98, 105, 116, 297.7, 298.1, 299.7, 300.7, 428/301.4; 156/196
See application file for complete search history.

(56) References Cited

U.S. PATENT DOCUMENTS

| 4,229,473 | A | * | 10/1980 | Elber ............................ 428/113 |
| 4,557,440 | A | * | 12/1985 | Adams ........................ 244/129.4 |
| 6,764,754 | B1 | * | 7/2004 | Hunter et al. ............... 428/301.4 |
| 7,014,143 | B2 | | 3/2006 | Pham et al. |
| 7,118,370 | B2 | | 10/2006 | Willden et al. |
| 2007/0102839 | A1 | | 5/2007 | McGowan et al. |
| 2007/0175573 | A1 | | 8/2007 | Fox et al. |

FOREIGN PATENT DOCUMENTS

EP 1151850 A 11/2001

OTHER PUBLICATIONS

PCT International Search for application PCT/US2008/072233 dated Oct. 26, 2009.

* cited by examiner

*Primary Examiner* — Brent T O'Hern
(74) *Attorney, Agent, or Firm* — Yee & Associates, P.C.

(57) ABSTRACT

Structural components are disclosed that are fabricated from unidirectional carbon fiber composite materials into compound contour profiles along a longitudinal axis thereof without wrinkling of composite material plies oriented in various directions relative to the longitudinal axis. Methods of stacking, sequencing, and applying the material plies to fabricate the components are also disclosed.

13 Claims, 6 Drawing Sheets

COMPOUND CONTOURED COMPOSITE BEAMS AND FABRICATION METHODS

BACKGROUND OF THE DISCLOSURE

This disclosure relates generally to the manufacture of structural components using composite fiber lamination processes, and more specifically to the formation of composite fiber laminate structures having contoured profiles.

The structural performance advantages of composites, such as, to name only a few, carbon fiber epoxy and graphite bismaleimide (BMI) materials, are widely known in the aerospace industry. Aircraft designers have been attracted to composites because of their superior stiffness, strength, and radar absorbing capabilities, for example. As more advanced materials and a wider variety of material forms have become available, aerospace usage of composites has increased. Automated tape layer technology has developed to become a widely used automated process for fabrication of large composite structures such as wing, without limitation, fuselage and empennage assemblies. Current composite fiber placement and tape laying technology has been improved to offer flexibility in process capabilities required for a wide variety of aerospace components. As composite lay-up processes improve with advances in automation new and innovative applications will be defined.

The fabrication of certain components from composite materials, such as support beams, frames and stiffeners for aircraft or vehicles is desired for reduced weight and improved corrosion and fatigue resistant capabilities. Such components typically would be laid-up with plies of unidirectional carbon fiber composite materials, with plies oriented differently from one another depending on the structural properties desired.

It has been observed, however, that some of the plies may wrinkle during the fabrication of certain components having non-uniform cross sections along the length of the part. This may result in the component having a varying, and discontinuous, outer contour or profile along its length. Such wrinkles are undesirable and have prevented widespread use and adoption of composite materials to fabricate components that may be prone to wrinkling of the composite materials.

BRIEF DESCRIPTION

Consistent with exemplary embodiments disclosed, components and fabrication methods are provided for the manufacture of structural components having discontinuities in their outer contour using composite material plies while avoiding undesirable wrinkling of some of the material plies used to fabricate the component.

In an exemplary embodiment, a structural component is disclosed. The component comprises a body formed from unidirectional carbon fiber composite plies, the body having a longitudinal axis and a cross section perpendicular to the longitudinal axis. The cross section varies along a portion of the longitudinal axis to provide the body with at least one uniform contour and at least one compound contour. The composite plies forming the uniform contour are discontinuous along the longitudinal axis.

Optionally, the cross section may comprise a web and at least one flange extending from the web. The fiber composite plies may comprise unidirectional tape preimpregnated material. The body may comprise a beam having a web and opposing flanges extending from the web, a portion of the opposing flanges extending parallel to one another, and a portion of the flanges extending obliquely to one another to define the compound contour. One of the opposing webs may be substantially straight and continuous, and one of the flanges may be in part parallel and in part oblique to the other flange. At least some of the composite plies forming the compound contour may be continuous along the longitudinal axis, thereby forming the compound contour profile without wrinkling of unidirectional fibers aligned with the longitudinal axis. The body may comprise multiple unidirectional carbon fiber composite plies arranged to define a linear profile and a non-linear profile, wherein the multiple plies forming the non-linear contoured profile are differently arranged from multiple plies forming the linear profile along the longitudinal axis of the component. The composite plies forming the fiber oriented parallel to the longitudinal axis may be discontinuous adjacent the non-linear contoured profile. The component may comprise an elongated beam.

An embodiment of a structural component fabricated from a composite material is also disclosed. The component comprises an elongated body formed from unidirectional carbon fiber composite plies, the body having a longitudinal axis and an axial length, an outer surface of the body being partly linear and partly non-linear along the axial length, and the plies having at least some fibers oriented parallel to the longitudinal axis. The fibers oriented parallel to the longitudinal axis are discontinuous along the non-linear outer surface, thereby avoiding wrinkling of the unidirectional fibers aligned with the longitudinal axis.

Optionally, the body may comprise a web and at least one flange, the flange defining the non-linear part of the body. The plies may comprise unidirectional tape preimpregnated material, and the non-linear portion may comprise a straight portion extending obliquely to the longitudinal axis and at least one radius portion. The multiple plies forming the non-linear contoured profile may be differently arranged from the linear profile along the longitudinal axis of the component.

A method of fabricating a composite structural element having in part a uniform contour and in part a compound contour is also disclosed. The component is formed from flat charges of plies of unidirectional carbon fiber composite material, and the method comprises: grouping the flat charges into discrete stacks of plies having zero degree fibers and plies having non-zero degree fibers; sequencing the stacks of flat charges to create discrete ply groups for the uniform and compound contour portions of the component, respectively, and separately applying at least some of the plies having zero degree fibers to the contoured and non-contoured portions of the component.

Optionally, grouping the flat charges into discrete stacks of non-zero degree plies comprises grouping the flat charges into plies having fibers oriented at plus 45° and minus 45° relative to the zero degree fibers. The component may be formed as a C-shaped channel having one straight flange, a web and one non-straight flange, the method further comprising: preparing a first drape charge of at least one ply having fiber oriented at plus 45 degrees and at least one ply having fiber oriented at minus 45 degrees, the first drape charge encompassing the straight flange, the web and the non-straight flange of the C-channel; preparing a second drape charge including a ply having fiber oriented at zero degrees covering the non-straight flange; preparing a third drape charge of at least one ply having fiber oriented at plus 45 degrees and at least one ply having fiber oriented at minus 45 degrees, the third drape charge encompassing the straight flange, the web and the non-straight flange of the C-channel; and preparing a fourth drape charge including a ply having fiber oriented at zero degrees being applied to non-straight flange.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Exemplary embodiments of components and methods of manufacturing the components using composite materials are disclosed herein below that facilitate formation of components with certain contours to be formed without undesirable fiber wrinkles. The exemplary components and methods disclosed facilitate a more extensive and efficient use of, for example, unidirectional carbon fiber materials in the manufacturing of components having, for example, compound contours as described below, that until now have proven either too difficult or to expensive to repeatedly produce in an efficient and acceptable manner. The ability to form composite components in such contoured shapes presents significant advantages, including design considerations that may demand unusual shapes and jogs in the profile of the components, weight savings of a support structure by utilizing lighter weight materials to fabricate the components, and the development of high performance components engineered for specific use.

In particular, the lighter weight composite materials used to form the components may achieve significant weight savings when utilized in combination to assemble a support structure or frame of, for example, an aircraft or other vehicle. Specifically for an aircraft construction having many support components, the potential weight savings can be substantial, leading to better fuel economy and reduced costs of operating the aircraft. Composite material components may also facilitate a reduction in maintenance costs.

Figure 1:
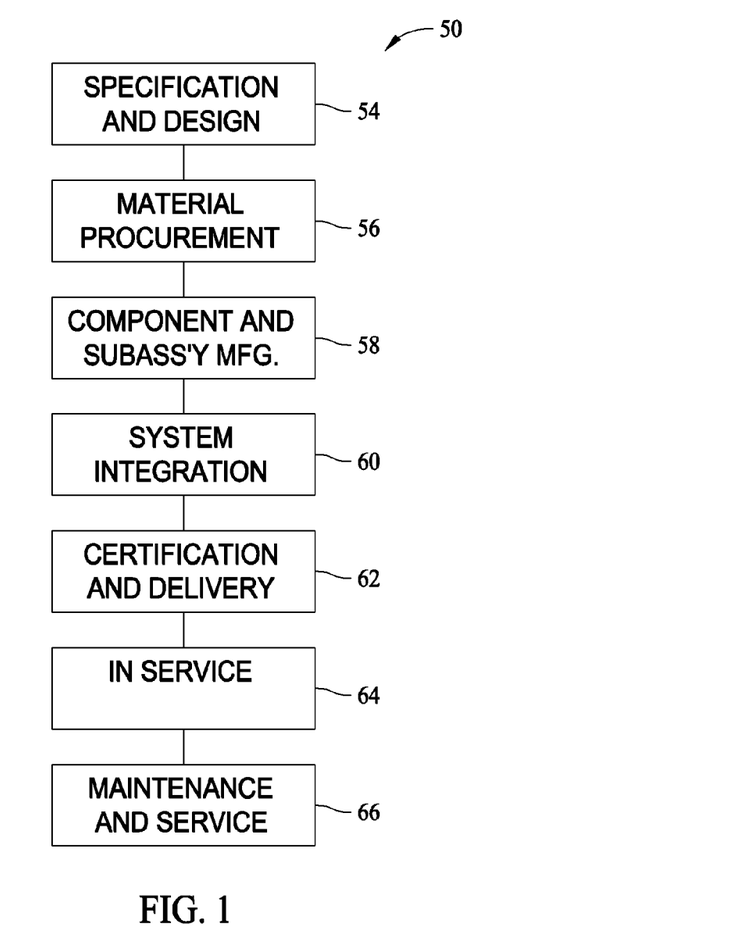
FIG. 1 is a flow diagram of aircraft production and service methodology.
Figure 2:
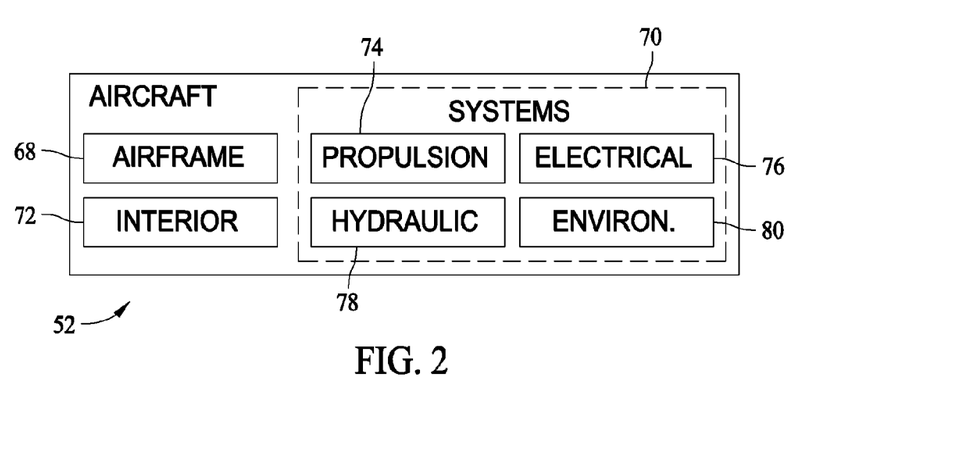
FIG. 2 is a block diagram of an aircraft.

Referring more particularly to the drawings, embodiments of the disclosure may be described in the context of an aircraft manufacturing and service method 50 as shown in FIG. 1 and an aircraft 52 as shown in FIG. 2. During pre-production, exemplary method 50 may include specification and design 54 of the aircraft 52 and material procurement 56. During production, component and subassembly manufacturing 58 and system integration 60 of the aircraft 52 takes place. Thereafter, the aircraft 52 may go through certification and delivery 62 in order to be placed in service 64. While in service by a customer, the aircraft 52 is scheduled for routine maintenance and service 66 (which may also include modification, reconfiguration, refurbishment, and so on).

Each of the processes of method 50 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 52 produced by exemplary method 50 may include an airframe 68 with a plurality of systems 70 and an interior 72. Examples of high-level systems 70 include one or more of a propulsion system 74, an electrical system 76, a hydraulic system 78, and an environmental system 80. Any number of other systems may be included. Although an aerospace example is shown, the principles of the invention may be applied to other industries, such as the automotive industry.

Apparatus and methods embodied herein may be employed during any one or more of the stages of the production and service method 50. For example, components or subassemblies corresponding to production process 58 may be fabricated or manufactured in a manner similar to components or subassemblies produced while the aircraft 52 is in service. Also, one or more apparatus embodiments, method embodiments, or a combination thereof may be utilized during the production stages 58 and 60, for example, by substantially expediting assembly of or reducing the cost of an aircraft 52. Similarly, one or more of apparatus embodiments, method embodiments, or a combination thereof may be utilized while the aircraft 52 is in service, for example and without limitation, to maintenance and service 66.

Figure 3:
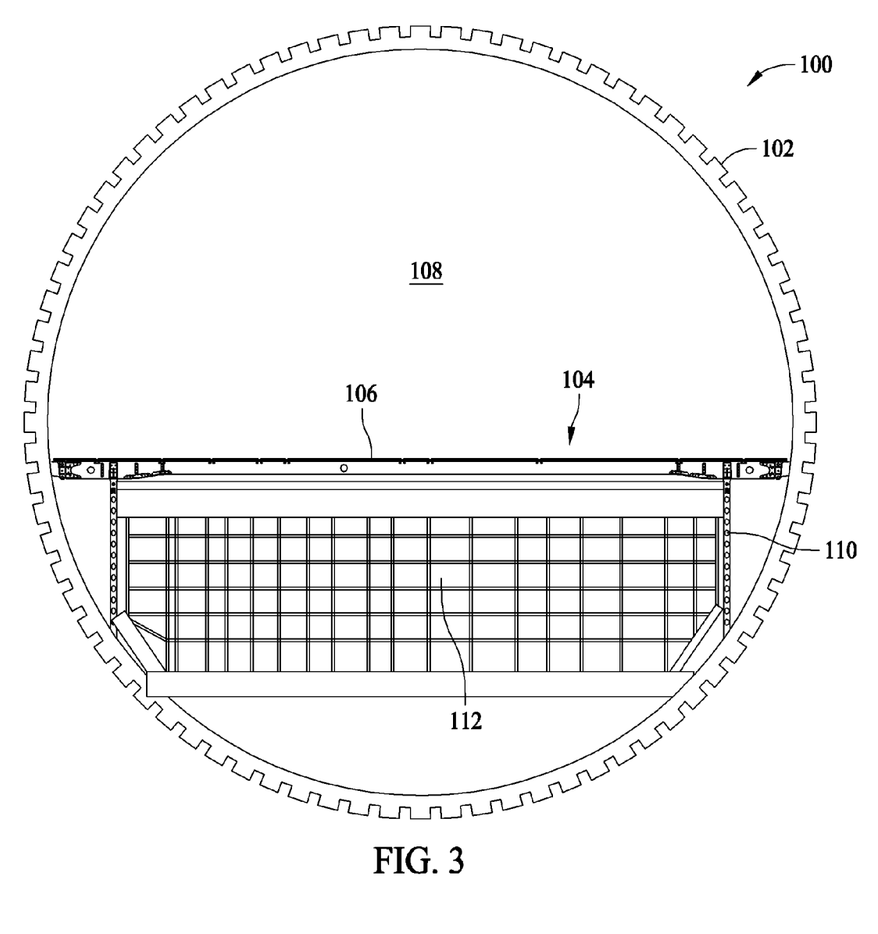
FIG. 3 is a cross sectional view of an aircraft illustrating an exemplary application of a structural component fabricated with composite materials.

FIG. 3 is a cross sectional view of an exemplary aircraft 100, that may correspond to the aircraft 52 of FIG. 2 that is the subject if the method 50 of FIG. 1, in which exemplary components and methods are to be explained. It is contemplated, however, that the benefits and advantages of the inventive component embodiments and formation methods described below may equally apply in other vehicle environments, such as automotive, truck, and recreational vehicles, as well as marine vehicles and non-vehicular applications such as buildings, towers, and other support structures. Generally speaking, the components and methods are applicable to any structural application wherein the benefits of composite material construction are desirable. The following discussion is therefore provided for purposes of illustration rather than limitation, and the components and methods disclosed herein are not intended to be restricted to any particular application, including but not limited to use in the aircraft 100, except when specifically defined as such in the appended claims.

As shown in FIG. 3, the aircraft 100 includes a fuselage 102 defining the outer body of the aircraft 100. A high performance, composite floor beam 104 is provided interior to the fuselage 102 and extends horizontally across an interior of the fuselage 102. The floor beam 104 serves as a structural component of the aircraft 100, and floor panels 106 extend upon and are connected to the floor beam 104 to provide a passenger compartment 108 above the floor panels 106. In accordance with known aircraft, the passenger compartment 108 is provided with seats and other amenities of modern aircraft for the safety, comfort, and convenience of travelers. In another embodiment, the compartment 108 could alternatively serve as a cargo compartment or for other use than a passenger compartment.

Stanchions 110 extend below the floor beam 104 and at least in part define a cargo compartment 112 beneath the floor beam 104. Also in accordance with known aircraft, the cargo compartment 112 may be adapted for storage of, for example, travel bags, travel gear, luggage or other items belong to aircraft passengers. Alternatively, or in addition to such items, the cargo compartment 112 may also be adapted to store, contain and secure other cargo items independent of, and not belonging to, any particular passenger of the aircraft in use. The aircraft 100 is amenable to civilian use predominately for transporting passengers and their personal goods from place to place, for military use in transporting personnel and equipment from location to location, or for commercial shipping and distribution of goods to different locations.

It should be understood that many floor beams 104 are provided along the length of the aircraft in a plane extending into and out of the plane of the page of FIG. 3. Larger aircraft 100 would require larger and longer beams 104 and a greater number of beams 104 than would a smaller aircraft 100. Collectively, the beams 104 provide structural support and framework for the aircraft 100.

Figure 4:
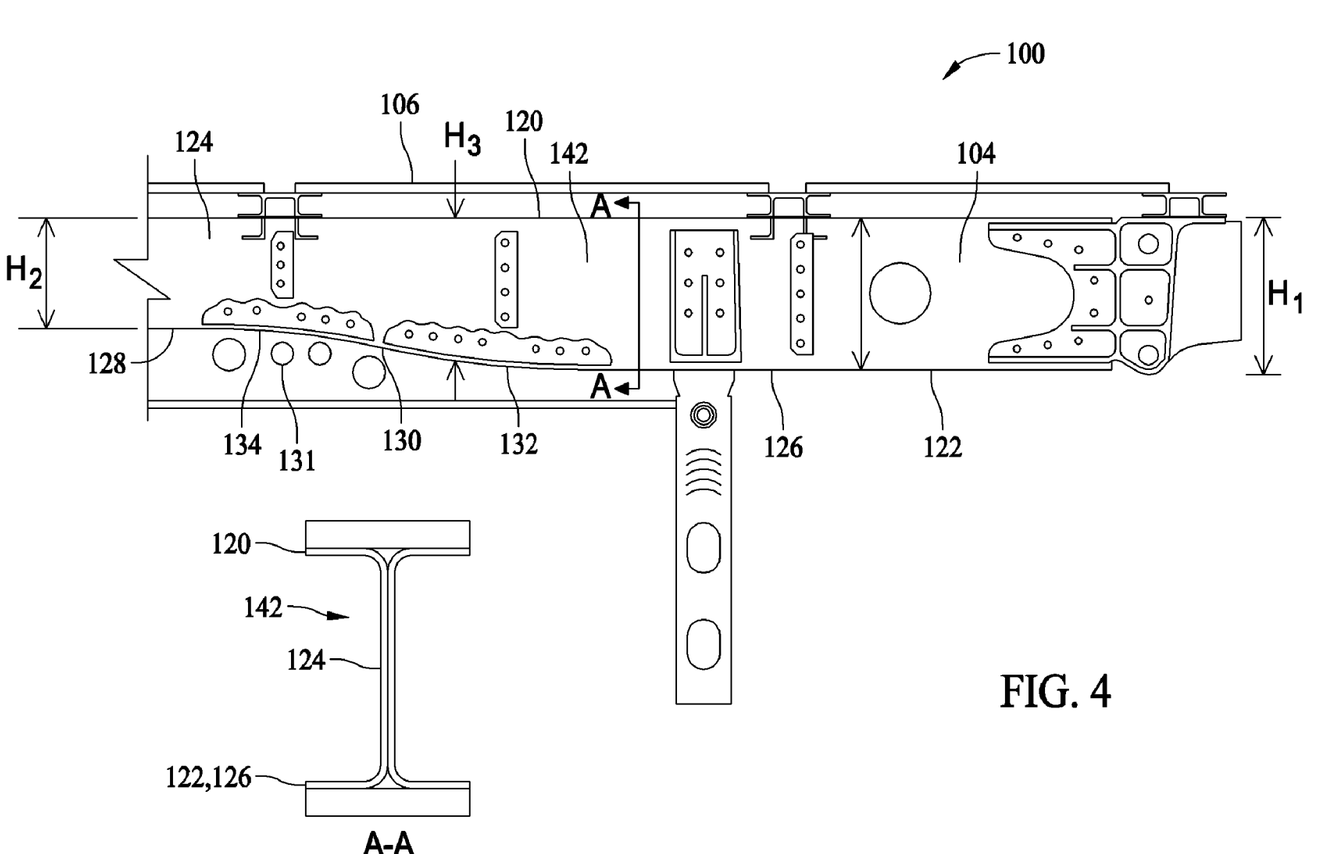
FIG. 4 is a magnified view of a portion of FIG. 3.

Turning now to FIG. 4, it is seen that the floor beam 104 in an exemplary embodiment is formed in the shape of an elongated I-shape having an upper flange 120, lower flange 122, and a web 124 interconnecting the upper and lower flanges 120 and 122. The upper flange 120 is generally straight and continuous while the lower flange 122 is neither straight nor continuous along the full length of the beam.

As shown in FIG. 4, the lower flange 122 includes a first portion 126, a second portion 128 and a transition portion 130 extending between the first and second portions 126 and 128. The first portion 126 is generally parallel to the first flange 120 and is spaced a first transverse distance $H_1$, measured in a perpendicular direction from the first flange 120. The second portion 128 also extends generally parallel to the first flange 120, and is spaced a distance $H_2$, also measured in a perpendicular direction from the first flange 120, that is less than $H_1$. In one example, $H_1$ is about 7.5 inches, and $H_2$ is about 5.6 inches. The lesser dimension $H_2$ provides for an increased clearance underlying the lower flange 122 to accommodate, for example, and without limitation, cables or conduits 131 that are run under the floor beam 104. While exemplary dimensions of $H_1$ and $H_2$ have been provided, they are by no means necessary, and it is appreciated that the values of $H_1$ and $H_2$ may vary in other embodiments.

Now considering the lower flange 122 in further detail, the transition portion 130 connects the first and second portions 126 and 128 that are generally straight and parallel to the first flange 120, and the transition portion 130 extends at an angle with respect to each of the first and second portions 126 and 128. In the illustrated embodiment, the transition portion 130 extends obliquely to the first flange 120 and each of the first and second portions 126 and 128 of the second flange 122 for a specified distance. At any given point along the transition portion 130, an edge of the transition portion is spaced from the first flange 120, measured in a direction perpendicular from the first flange 120, at a third and variable distance $H_3$ that is between the distance $H_1$ and $H_2$. That is, $H_3$ is nearly equal to $H_1$ where the transition portion 130 abuts the first portion 122, and gradually decreases to a value approximately equal to $H_2$ where the transition portion 130 abuts the second portion 128.

The inflection points 132 and 134 connecting the transition portion 130 to the first and second portions 126 and 128 present a discontinuity in the outer surface contour of the second flange 122 and the beam 104 overall. In practice, the inflection points 132 and 134 present radiuses that interconnect the ends of the transition portion 130 to the first and second portions 126 and 128 of the second flange. One of the radii at point 132 is a convex radius and the other radius at point 134 is a concave radius.

Following the contour of the lower flange 122 from right to left in FIG. 4, the first portion 126 is generally straight, smooth and horizontal in its outer shape and contour until it meets the convex radius at point 132. After the convex radius 132, the flange 122 in the transition portion 130 again becomes straight and generally smooth but extends at an angle or incline with respect to the first portion 126 until the transition portion 130 meets the concave radius at connecting point 134. After the radius at point 134, the lower flange 122 in the portion 128 again becomes generally straight, smooth, and horizontal. Collectively, the portions 126, 128 and the transition portion 130 render the contour of the lower flange 122 as neither straight nor smooth because of the discontinuities between the straight and curved portions at the inflection points 132 and 134.

The transition portion 130 in the illustrated embodiment is shaped so that the lower flange 122 makes an inward jog to reduce the height profile of the beam 104 and may provide increased clearance for the cables or conduits 131, or a greater height of the web 124 where needed. The joggle may allow placement of the cables and conduits 131 in a more compact arrangement relative to the beam 104, without significantly impacting the use of space above or below the beam 104. In the context of a floor beam, this arrangement is sometimes referred to as a "joggle" that presents particular manufacturing challenges to formation of the beam 104 using composite materials. Referring back to FIG. 3 for a moment, the beam 104 may have more than one transition portion 130 forming more than one joggle along the length of the beam to provide a relatively large span of beam having an increased clearance for running cables and conduit, or for accommodating other mechanical and electrical components of the aircraft.

It has been observed that when attempting to construct the beam 104 from plies of unidirectional carbon fiber composite materials, it has been observed that some of the plies of material may wrinkle along the lower flange 122 in the region of the transition portion 130. As mentioned, such wrinkles may be undesirable, and efforts to reliably construct acceptable beams with composite materials in a cost effective manner have generally proven unsuccessful until the inventive beam and methods for fabricating the same were discovered and developed.

Figure 5:
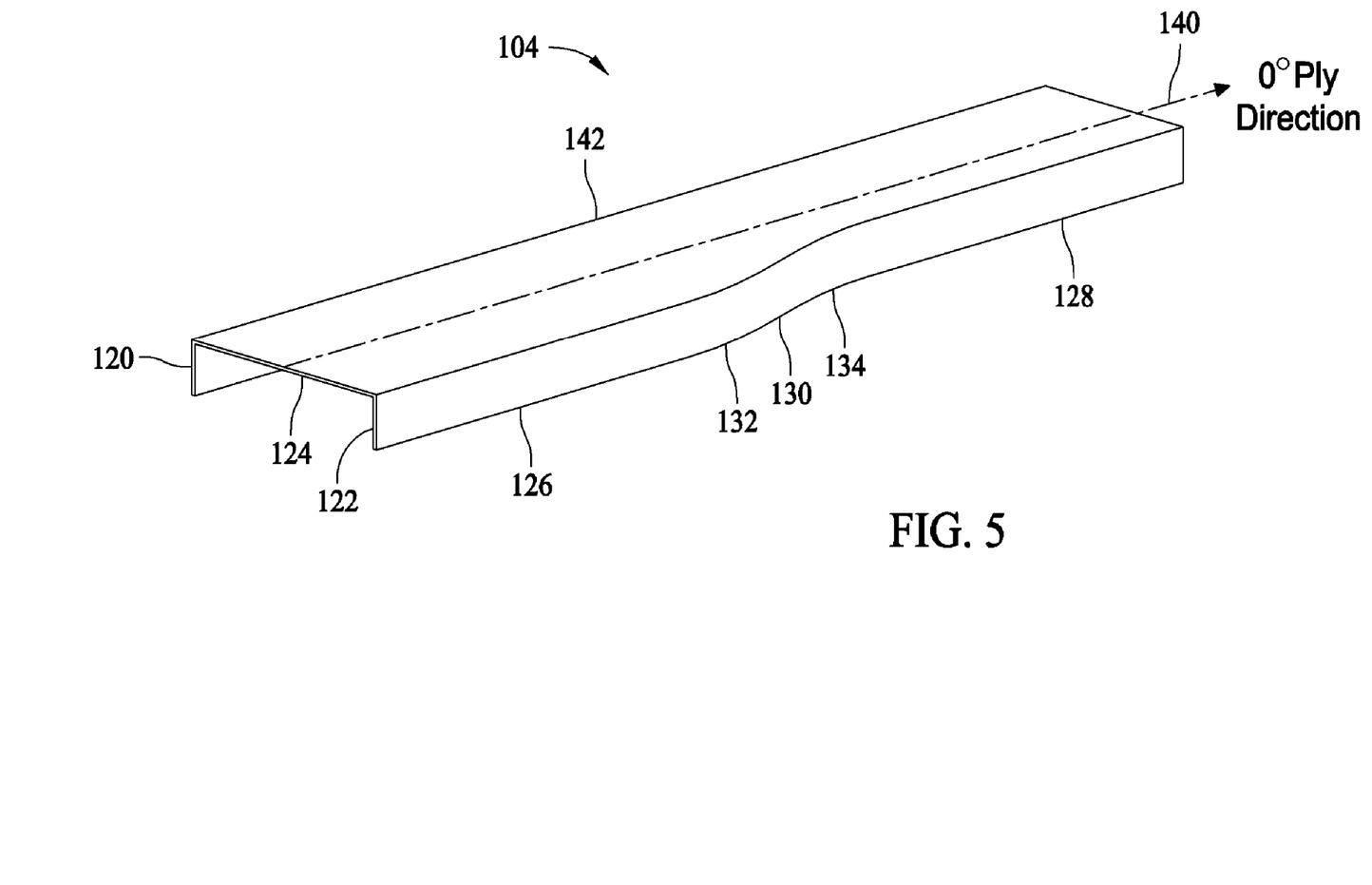
FIG. 5 is a perspective view of a portion of the component shown in FIGS. 3 and 4

FIG. 5 illustrates a portion of a C-shaped channel charge 142 used to fabricate the beam 104. As is believed to be evident from FIG. 4, two C-shaped channel charges 142 may be assembled back-to-back and secured to one another to form, for example, the I-shaped beam 104. The charge 142 is shown in perspective view in FIG. 5 wherein the manufacturing issues are perhaps a bit more evident. As previously explained, the beam construction, including the flanges 120 and 122, generally oppose one another and interconnect the web 124 in a C-shaped channel arrangement. The flanges 120 and 122 generally extend perpendicularly from the web 124. The beam 104 is generally elongated and has a longitudinal axis 140. The first flange 120 in the exemplary embodiment may be generally straight and continuous and may extend parallel to the longitudinal axis 140. The first and second portions 126 and 128 also extend generally parallel to the first flange 120 and to one another, but are spaced at different distances from the first flange 120 as previously described. The web 124 is also generally planar and extends parallel to the longitudinal axis 140. As is evident from FIG. 5, however, the transition portion 130 and the radius of the respective inflection points 132 and 134 are not parallel to the longitudinal axis 140.

In the second flange 122, the combination of the straight portions 126 and 128, the convex and concave curvature of the radiused portions 132 and 134, and the smooth but obliquely extending portion therebetween in the transition portion 130, is one example of what is sometimes referred to as a compound contour. The transition portion 130 in the illustrated embodiment is partly rounded at the inflection points 132 and 134 having different centers of curvature and potentially different radius of curvature, and is partly tapered to reduce the outer profile of the beam.

While a specific example of a compound contour is illustrated in the figures, it is to be appreciated that other shapes of compound contours are possible would also benefit from the techniques explained below that avoid wrinkling of the composite materials when constructing structural components, including but not limited floor beams. In other embodiments, it is not necessary that a compound contour have all of the features noted in the beam 104. That is, a contour can be a compound contour and not have both convex and concave radiuses, and a compound contour further does not necessarily require different straight portions that are angled, sloped or inclined relative to one another.

As used herein, the term "compound contour" shall broadly refer to any shape or outer surface profile that includes one or more significant changes and associated inconsistency in its outer shape and profile, exclusive of surface openings, indentations and the like for attaching the component to a structure, or for attaching other structures to the component. That is, as used herein the "profile" refers to the overall shape of the component as a whole, that may generally not be dependent on or affected by openings or other attachment features for mounting of the component in a specified location. The changes and inconsistency in the outer shape and profile of the component forming a compound contour may be characterized by a combination of intersecting surfaces of different character that may be discretely identifiable from one another. Different character of adjoining or intersecting surfaces may be identifiable by the presence of one or more inflection points, one or more rounded surfaces, different types of curved surfaces such as convex and concave surfaces, one or more curvatures having different centers and radius, straight portions that are differently sloped relative to one another, abrupt changes in the outer profile, and combinations thereof. "Compound contours" are specifically distinguished from simple contours, examples of which include, but are not limited to, a component that is uniformly tapered along its entire length, a component that is uniformly curved along its entire length, and a component that has a uniform or unchanging contour along its entire length.

As a result of the compound contour of the beam 104 in the illustrated embodiment, the cross section of the beam 104, taken in a plane perpendicular to the longitudinal axis 140, is not uniform along the length of the beam. Portions of the beam having a constant or continuous cross sectional are sometimes referred to as linear portions of the beam 104, while the transition portion of the beam is sometimes referred to as a non-linear portion of the beam 104 by virtue of its changing or variable cross section and outer shape along the length of the beam 104.

Wrinkling of the composite material plies when attempting to construct such a contoured structural component as the beam 104 using conventional composite fabrication processes laying-up different plies of composite material is believed to lie in composite material plies having the structural fibers arranged to be oriented with the longitudinal axis 140 along the length of the beam 104. Particularly, and because of the shape of the lower flange 122 having the transition portion 130, the fibers that are oriented along and generally parallel to the longitudinal axis 140 in the straight portions 126 and 128 are bent and placed in compression as the transition portion 130 is shaped, causing some of the fibers to compress and bow or buckle and create the wrinkles. Such bowing of the fibers may also cause wrinkles in other adjacent composite material plies wherein the structural fibers are not aligned with the longitudinal axis 140, such as plies wherein the structural fibers are oriented at, for example, 45° and 90° angles to the longitudinal axis 140. It has been observed, for example, that when constructing the shape of channel charge 142 illustrated in FIG. 5 with a lay-up of composite material plies, plies with fibers oriented plus 45°, 90° and −45° measured from the longitudinal axis 140 do not tend to create wrinkles in the lower flange 122 unless 0° plies or plies having fibers extending parallel to the longitudinal axis 140, are also present.

In recognition of this issue with the longitudinally extending fibers extending at a 0° angle from the longitudinal axis 140 (i.e., parallel to the longitudinal axis), the beam 104, unlike conventional fabrication techniques that produce wrinkles, is fabricated using different ply orientations for the various portions of the beam 104, and notably does not involve the bending of fibers oriented along the longitudinal axis 140 to produce the compound contour. Rather, the plies having fibers oriented parallel to the longitudinal axis are cut so that they are discontinuous along, for example, the contoured edges of the web 124 and flange 122 over the length of the part. The material plies that would otherwise result in compression of the fibers oriented along the longitudinal axis 140 are separated out from the component construction and these plies are placed independently from the other plies having fibers oriented differently along the longitudinal axis to form the contoured flange. As a result of the discontinuous nature of the fibers oriented parallel to the longitudinal axis 140, and also separate application of those fibers to the contoured portions of the beam 104, none of those fibers are placed in compression during fabrication of the beam 104, thus avoiding wrinkles in the formed component.

Still further, a unique approach is taken during the lay-up of flat charges used to form the beam 104. In one embodiment, for example, the flat charges are grouped as much as possible into discrete stacks of either 0° plies with fibers extending parallel to the longitudinal axis 140, or plies having fibers oriented at +45°, 90° and −45° with respect to the longitudinal axis. That is, the approach involves sequencing of a lay-up to create discrete ply groups consisting of 0° plies and groups of +45°, 90° and −45° plies. The 0° ply groups are separated into discrete web and flange elements along the contoured portion of the channel charge 142. In particular, the 0° plies used to fabricate the contoured flange elements are not draped along with the plies to form the other elements of the charge 142, but rather are linearly placed along the length of the part by hand or machine. This avoids the wrinkles that would occur if the 0° contoured flange elements were integral with the other lay-up elements.

An exemplary machine that is suitable for laying-up of the plies is disclosed in commonly owned U.S. Pat. No. 7,188,370. It is believed that this machine and other machines are familiar to those in the art of fabrication of components using composite materials and that detailed discussion of the machines is generally beyond the scope of this disclosure. Further detail and explanation thereof are not believed to be necessary for those skilled in the art. In other embodiments, it is contemplated that the charges may be laid up manually.

Figure 6:
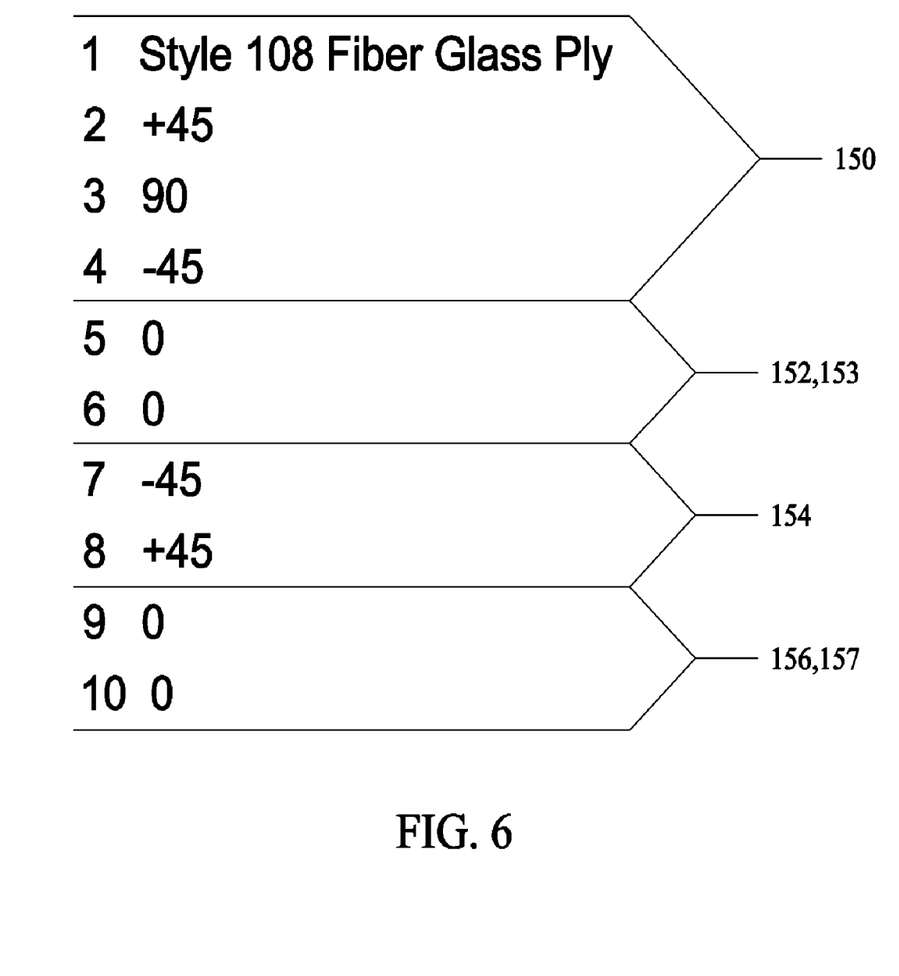
FIG. 6 illustrates an exemplary charge lay-up and sequencing method for the manufacture of the component shown in FIG. 5.
Figure 7:
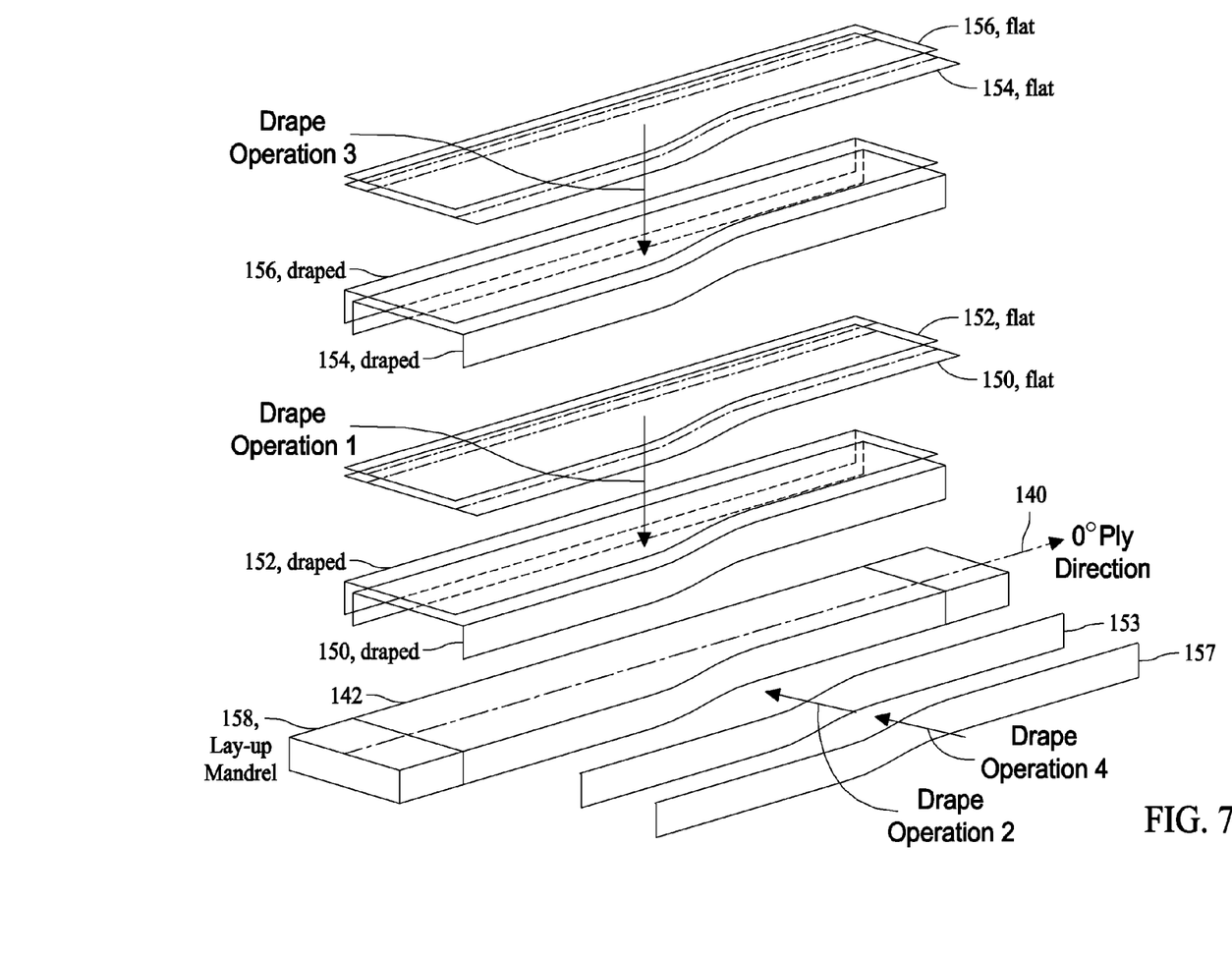
FIG. 7 is an exploded view of the component illustrating its manufacture.

FIGS. 6 and 7 illustrate further details of the charge 142 and an exemplary charge lay-up and a method of sequencing composite charges for fabricating the C-shaped channel charge 142 from, for example, unidirectional tape preimpregnated material, and more specifically, "Style 108" resin impregnated fiberglass fabric material plies. The method involves various plies having fibers stacked and sequenced to be oriented differently with respect to one another, and separately applying some of the plies to the linear and non-linear portions of the component. References to degrees in connection with the plies in the following discussion shall be understood to refer to the relative orientation of the fibers of the plies with respect to the axis 140 of the C-shaped channel charge 142. As such, a zero degree ply would have its fibers oriented parallel to the longitudinal axis. Also, as shown in FIG. 8, the charge drapes may be laid up and assembled using a lay-up mandrel 158 having the desired shape of the component to be fabricated.

For example, and considering the C-shaped channel charge 142 shown in FIG. 5, and also referring to FIGS. 6 and 7, a first drape charge 150 may be prepared in a first drape operation wherein one plus 45 degree oriented layer, a 90 degree layer, and one minus 45 degree layer are laid flat and draped over the mandrel 158 to form part of the first flange 120, the second flange 122 and the web 124.

In a second drape operation, two zero degree plies 152 and 153 are separately laid on the web 124 and the countoured flange 122. One of the zero degree plies 152 covers the web 124 and the straight flange 120. The other of the zero degree plies 153 covers the contoured flange 122.

While the zero degree ply 152 covering the web 124 and the straight flange 120 is illustrated as part of the second drape operation in FIG. 6, it is understood that the may the zero degree ply 152 may alternatively be combined and formed simultaneously with the drape charge 150 of the first drape operation. In such an embodiment, however, the zero degree ply 153 would still be separately laid in the separate drape operation.

In a third drape operation, one plus 45 degree layer and one minus 45 degree layer 154 are laid flat and draped over the layers of the first and second drape operation. That is the layers of the third drape operation form part of the first flange 120, the second flange 122 and the web 124.

In a fourth drape operation, a zero degree ply 156 and a zero degree ply 157 are separately laid on the web 124, the straight flange 122 and the contoured flange 122. The ply 156 covers the web 124 and the straight flange 120, and the ply 157 covers the contoured flange 122.

While the zero degree ply 156 covering the web 124 and the straight flange 120 is illustrated as part of the fourth drape operation in FIG. 6, it is understood that the zero degree ply 156 may alternatively be combined and formed simultaneously with the drape charge 154 of the third drape operation. In such an embodiment, however, the zero degree ply 157 would still be separately laid in the separate drape operation.

After the channel charge drape operations have been completed, the charge 142 is ready for assembly to produce, for example the floor beam 104 described in FIGS. 3 and 4.

While one example of the charge lay-up and method of sequencing plies having fibers oriented at plus and minus 45° and 90°, in addition to the zero degree plies, it is to be appreciated that the non-zero plies do not have to be oriented at plus or minus 45° and/or 90° in other embodiments. Other angles of fibers may likewise be utilized to meet particular needs and desires for forming components and for meeting particular objectives. It is also contemplated that in some embodiments certain of the plies, such as the 90° plies discussed above, may be considered optional.

Using the above-described methodology, structural components such as the beam 104, or other beams, stiffeners or other structural components having significant compound contour and surface discontinuities, may therefore be effi-ciently fabricated from unidirectional carbon fiber composite materials. More extensive and efficient use of unidirectional carbon fiber materials to fabricate components having contoured shapes without unacceptable wrinkling of the composite plies is facilitated, and appreciable weight savings may be realized when the components such as the beams 104 are assembled into a larger structure.

While an exemplary beam 104 and C-shaped charge 142 having exemplary shapes have been described, it is to be understood that other components having other shapes and cross sections may likewise be formed while avoiding issues associated with wrinkling of the plies. Any component having a web and one or more flanges arranged in any shape may be benefit from the above-described methodology. For example, and without limitation, in addition to the I-shaped beam 104 described above, similar techniques could be used to form contours in a J-shaped component having a compound contour, an L-shaped component having a single contoured flange extending from a web, a T-shaped component having at least one portion with a compound contour, and a Z-shaped component having at a least portion thereof with a compound contour. As still further non-limiting examples, components having a cross section shape resembling a number, such as the number "7" may be formed. Still other shapes are possible that are not reminiscent of the shapes of letters and numbers, including but-not limited to top-hat shapes and other shapes and cross sections. Moreover, combinations of such exemplary shapes of components may be assembled to form still other shapes, such as the C-shaped channels described above that are used to produce an I-shaped beam.

Likewise, such techniques may be utilized to form tubular elements (rectangular and square) with contours that may otherwise result in wrinkled composite materials. While the exemplary embodiments illustrated herein include one straight flange and one contoured flange, it is understood that in further and/or alternative embodiments, more than one contoured flange may be manufactured in the same component using the methods and techniques discussed above. That is, components having multiple contoured flanges could be formed into a vast number of desired shapes to produce components without undesirable wrinkling.

Also, while the component embodiments and methods of fabricating them have thus far been disclosed in the context of a floor beam, other structural components may also be fabricated that avoid similar problems and offer similar advantages. That is, beams for other purposes may equally benefit from the techniques disclosed herein, as well as non-beam components that provide structural strength and support to an assembly of components collectively defining a larger structure.

While the disclosed components and methods have been described in terms of various specific embodiments, those skilled in the art will recognize that the components and methods can be practiced with modification within the spirit and scope of the claims.

What is claimed is:
1. A structural component usable in an aircraft comprising:
   a body formed from a plurality of composite plies, each composite ply having unidirectional fibers, the body having a longitudinal axis and a cross section perpendicular to the longitudinal axis, the cross section varying along at least a portion of the longitudinal axis to provide the body with at least one uniform contour profile portion and at least one compound contour profile portion;
   a first side flange of the body having a substantially linear portion along the axial length;

a second side flange of the body having a substantially linear portion and a non-linear portion along the axial length forming the compound contour profile;

a web of the body, the web positioned between the first side flange and the second side flange;

wherein the first side flange is positioned opposite the second side flange and wherein the first side flange and second side flange are disposed substantially normal to the web; and the plurality of composite plies including composite plies having unidirectional fibers oriented substantially parallel to the longitudinal axis, the composite plies having unidirectional fibers oriented substantially parallel to the longitudinal axis comprising first and second composite ply portions, the first composite ply portion forming the uniform contour profile portion and the second composite ply portion forming the compound contour profile portion.

2. The component of claim 1, wherein the unidirectional fibers comprise carbon fibers.

3. The component of claim 1, wherein the compound contour profile portion comprises:

a first straight portion having a first and uniform cross section along the longitudinal axis;

a second straight portion having a second and uniform cross section along the longitudinal axis, the second cross section being different from the first cross section; and a transition portion extending between the first and second straight portions and having a third cross section that is not uniform along the longitudinal axis.

4. The component of claim 1, wherein the first and second composite ply portions are discontinuous at an edge between the uniform contour profile portion and the compound contour profile portion.

5. The component of claim 1, wherein the component comprises an elongated beam.

6. The component of claim 1, wherein the first and second composite ply portions are discontinuous at an edge between the web and the flange.

7. The component of claim 1, wherein the plurality of composite plies further comprises composite plies having unidirectional fibers oriented at a non-parallel angle with respect to the longitudinal axis, the composite plies having unidirectional fibers oriented at a non-parallel angle with respect to the longitudinal axis comprising continuous composite plies that form both the uniform contour profile portion and the compound contour profile portion.

8. The component of claim 7, wherein the composite plies having unidirectional fibers oriented at a non-parallel angle with respect to the longitudinal axis comprise composite plies having unidirectional fibers oriented at one or more of plus forty-five degrees, minus forty-five degrees, plus ninety degrees and minus ninety degrees with respect to the longitudinal axis.

9. A structural component usable in an aircraft structure fabricated from a composite material, the component comprising:

an elongated body formed from a plurality of composite plies, each composite ply having a plurality of unidirectional carbon fibers, the elongated body having a longitudinal axis and an axial length;

a first side flange of the body having a substantially linear portion along the axial length;

a second side flange of the body having a substantially linear portion and a non-linear portion along the axial length forming a compound contour profile;

a web of the body, the web positioned between the first side flange and the second side flange;

wherein the first side flange is positioned opposite the second side flange and wherein the first side flange and second side flange are disposed substantially normal to the web; and the plurality of composite plies comprising composite plies having unidirectional carbon fibers oriented substantially parallel to the longitudinal axis and composite plies having unidirectional carbon fibers oriented at a non-parallel angle with respect to the longitudinal axis, the composite plies having unidirectional carbon fibers oriented substantially parallel to the longitudinal axis comprising first and second composite ply portions, the first composite ply portion forming the linear portion and the second composite ply portion forming the non-linear portion; and the composite plies having unidirectional carbon fibers oriented at a non-parallel angle with respect to the longitudinal axis comprising continuous composite plies that form both the linear portion and the non-linear portion.

10. The component of claim 9, wherein each composite ply of the plurality of composite plies comprise unidirectional tape preimpregnated material.

11. The component of claim 9, wherein the non-linear portion comprises a straight portion extending obliquely to the longitudinal axis and at least one radiused portion.

12. The component of claim 9, wherein the composite plies having unidirectional carbon fibers oriented at a non-parallel angle with respect to the longitudinal axis comprise composite plies having unidirectional carbon fibers oriented at one or more of plus forty-five degrees, minus forty-five degrees, plus ninety degrees and minus ninety degrees with respect to the longitudinal axis.

13. The component of claim 9, wherein the first and second composite ply portions are discontinuous at an edge between the linear portion and the non-linear portion.

* * * * *